US007041953B2

(12) United States Patent
Byren

(10) Patent No.: US 7,041,953 B2
(45) Date of Patent: May 9, 2006

(54) BEAM CONTROL SYSTEM WITH EXTENDED BEACON AND METHOD

(75) Inventor: Robert W. Byren, Manhattan Beach, CA (US)

(73) Assignee: Raytheon Company, Waltham, MA (US)

(*) Notice: Subject to any disclaimer, the term of this patent is extended or adjusted under 35 U.S.C. 154(b) by 0 days.

(21) Appl. No.: 10/902,624

(22) Filed: Jul. 29, 2004

(65) Prior Publication Data

US 2006/0022115 A1 Feb. 2, 2006

(51) Int. Cl.
*G01J 1/20* (2006.01)

(52) U.S. Cl. .................................. 250/201.9; 356/521
(58) Field of Classification Search ............. 250/201.9; 356/521
See application file for complete search history.

(56) References Cited

U.S. PATENT DOCUMENTS

| 5,287,165 | A | * | 2/1994 | Ulich et al. | .................. | 356/121 |
| 5,745,309 | A | | 4/1998 | Slamon | | |
| 6,278,100 | B1 | * | 8/2001 | Friedman et al. | ........ | 250/201.9 |
| 6,563,572 | B1 | | 5/2003 | Radick et al. | | |
| 6,809,307 | B1 | * | 10/2004 | Byren et al. | ............. | 250/201.9 |

OTHER PUBLICATIONS

Tyson and Ulrich, "Adaptive Optics", The Infrared and Electro-Optical Handbook, vol. 8, Chapter 2, ERIM, Ann Arbor, MI, pp. 165-237; (1963).
Golnick, "Directed Energy Systems", The Infrared and Electro-Optical Handbook, vol. 8, Chapter 5, ERIM, Ann Arbor, MI, pp. 403-480, (1963).

* cited by examiner

*Primary Examiner*—Stephone B. Allen
*Assistant Examiner*—Patrick J. Lee
(74) *Attorney, Agent, or Firm*—John E. Gunther; Leonard A. Alkov

(57) ABSTRACT

A beam control system and method: The inventive system includes, an arrangement for receiving a first beam of electromagnetic energy; measuring wavefront aberrations in the first beam with a wavefront sensor; and removing global tilt from the measured wavefront aberrations to provide higher order aberrations for beam control. In the illustrative embodiment, the invention uses a traditional (quad-cell) Shack-Hartmann wavefront sensor to measure wavefront aberrations. An adaptive optics processor electronically removes the global tilt (angular jitter) from this measurement leaving only the higher-order Zernike components. These higher-order aberrations are then applied to wavefront control elements, such as deformable mirrors or spatial light modulators that correct the tracker image and apply a conjugate distortion to the wavefront of the outgoing HEL beam. A track error (angular jitter) component is supplied by a separate fine track sensor. This jitter error is then applied by the adaptive optics processor to a fast steering mirror, which corrects jitter in the tracker image and applies a compensating distortion to the LOS of the HEL beam.

18 Claims, 5 Drawing Sheets

BEAM CONTROL SYSTEM WITH EXTENDED BEACON AND METHOD

BACKGROUND OF THE INVENTION

1. Field of the Invention

The present invention relates to optics. More specifically, the present invention relates to systems and methods for directing and correcting high-power beams of electromagnetic energy.

2. Description of the Related Art

Directed energy weapons and specifically high-energy laser (HEL) weapons are being considered for variety of military applications with respect to a variety of platforms, e.g., spaceborne, airborne and land based systems to name a few. These weapons generally involve the use of the laser or other source of a high-power electromagnetic radiation beam to track and destroy a target. To achieve mission objectives, directed energy weapons must be accurately steered and optimally focused. Steering involves line-of-sight control while focusing, with respect to HEL weapons, involves wavefront error correction.

In particular, high energy laser (HEL) beam control systems used on high performance tactical fighter aircraft require adaptive optics to correct for aero-optic distortions caused by turbulent boundary layers, flow separation zones, unsteady shocks and downstream wake structures in the immediate vicinity of the HEL beam director turret. Although the flowfield introduces severe time-varying wavefront errors, these optical path-length difference (OPD) errors occur only within the first tens of meters of propagation and the isoplanatic angle for such a thin, near-field aero-optic distortion is typically large, encompassing the entire extended target, not just the center. For this case, correcting the aberration along the line of sight to any part of the target (using a simple phase-only adaptive optic system) will effectively compensate the entire image of the target and provide a distortion-corrected path for the HEL beam to any aimpoint located on the target. The isoplanatic angle is the limiting angle across which optical rays emanating from the target follow essentially the same propagation path from the target to the beam control aperture. Stated differently, the optical phase fronts reaching the beam control aperture from two point sources at the target are just decorrelated when the points are separated by the isoplanatic angle.

As discussed above, advanced laser beam control systems typically use a two-illuminator system: one to track the hard body of a target and one for wavefront sensing. Active tracking typically requires a larger illuminated field due to the need to see the entire target, track features of the target (often located at the edges of the target), ascertain vulnerable aimpoints and maintain a stable line-of sight to the aimpoint. The wavefront sensing portion typically uses a beacon illuminator laser with a more narrow beam, which is directed by the beam control system to the aimpoint on the target. An adaptive optics system uses the return from the beacon illuminator to measure the wavefront error due to the flowfield (aero-optic) and the intervening atmosphere (atmospheric turbulence). This two-illuminator approach is necessary in long-range airborne theater missile defense and ground-based air defense scenarios due to the small isoplanatic angle relative to the size of the target hard body representative of these scenarios.

However, as is well-known in the art, inasmuch as high power, high performance lasers and optical systems are required to generate each of the two illumination beams, the two beam systems of the prior art are complicated and somewhat costly to implement.

Thus, a need exists in the art for a less complex and more affordable system or method for tracking a target, steering a high energy beam thereto, and correcting the optical phase distortions in the propagation path when a relatively large isoplanatic angle is anticipated.

SUMMARY OF THE INVENTION

The need in the art is addressed by the beam control system and method of the present invention. Generally, the inventive beam control system and method includes an arrangement for receiving a first beam of electromagnetic energy; tracking the target using an active fine track sensor and fast steering mirror, measuring wavefront aberrations in the illuminator beam with an active wavefront sensor; and removing the global wavefront tilt modes (angular jitter) from the measured wavefront aberrations to provide only the higher order wavefront error modes which are used in an adaptive optics control system to predistort the high power beam in order to correct the high order errors.

In the illustrative embodiment, the invention uses a traditional (quad-cell) Shack-Hartmann wavefront sensor to measure the wavefront aberrations due to the aero-optic aberrations in the near flowfield around the turret and aircraft and atmospheric turbulence;. The adaptive optics processor electronically removes the tilt (angular jitter) from this measurement, which is corrupted by the illuminator beam motion at the target, leaving only the higher-order components, which include focus, astigmatism, coma, trefoil, and others of even greater Zernike order. These higher-order aberrations are then applied to wavefront control elements, such as deformable mirrors or spatial light modulators that correct the tracker image and apply a conjugate distortion to the wavefront of the outgoing HEL beam according to traditional teachings.

A wide-bandwidth (active or passive) fine track sensor using traditional centroid and/or correlation track algorithms measures the proper aimpoint track error (angular jitter) due to (1) relative target movement, (2) atmospheric and aero-optic effects, and/or (3) base motion disturbances, which are coupled into the line-of-sight (LOS). This measurement will be free of artifacts from the illuminator beam motion at the target. The track error is then applied by the adaptive optics processor to a fast steering mirror, which corrects jitter in the tracker image and applies a compensating distortion to the LOS of the HEL beam.

In short, the invention uses a traditional Hartman or other wavefront sensor with an extended beacon for HEL beam control. In accordance, with the present teachings, an angular jitter component is removed from the wavefront sensor data and supplied by the angular track information provided by a separate fine track sensor.

DESCRIPTION OF THE INVENTION

Illustrative embodiments and exemplary applications will now be described with reference to the accompanying drawings to disclose the advantageous teachings of the present invention.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

As discussed above, advanced laser beam control systems typically use a two-illuminator system. The first is a track illuminator laser which floods the target area with laser light allowing an active fine track sensor to track the hard body of a target. The second is a beacon illuminator laser which provides a narrow beam on the target aimpoint the return from which is used by an active wavefront sensor to measure the wavefront error due to the flowfield (aero-optic) and the intervening atmosphere (atmospheric turbulence). This two-illuminator approach is necessary due to the small isoplanatic angle relative to the size of the target hard body that typical long-range airborne theater missile defense and ground-based air defense scenarios afford.

For a typical air-to-ground tactical HEL engagement scenario, the isoplanatic angle may be comparable to the target size within the ranges of interest making a single-illuminator solution feasible. The problem with the single beacon illuminator is that motion of the extended beacon would be erroneously interpreted by a conventional wavefront sensor as aimpoint motion, thereby generating a line-of-sight error. While such an adaptive optics system may properly correct for high order wavefront errors and allow the HEL beam to be focused at the target, it might cause the HEL beam to follow the beacon as opposed to following the target aimpoint.

One solution to this problem is taught by Radick, et al. in U.S. Pat. No. 6,563,572. This inventive approach uses a correlation track process within a Hartmann wavefront sensor which tracks target features and is not sensitive to the beacon motion at the target. However, the sensor hardware to implement the correlation track approach is complex, requiring a high resolution imaging system at each Hartman subaperture, and the processor-throughput is very high, requiring a separate wide bandwidth tracker for each subaperture.

Hence, a need exists in the art for a less complex and more affordable system or method for tracking a target and steering a corrected high energy beam thereto. The need is addressed by the present invention in a manner best illustrated with an initial review of certain prior high-energy laser beam control architectures.

Figure 1:
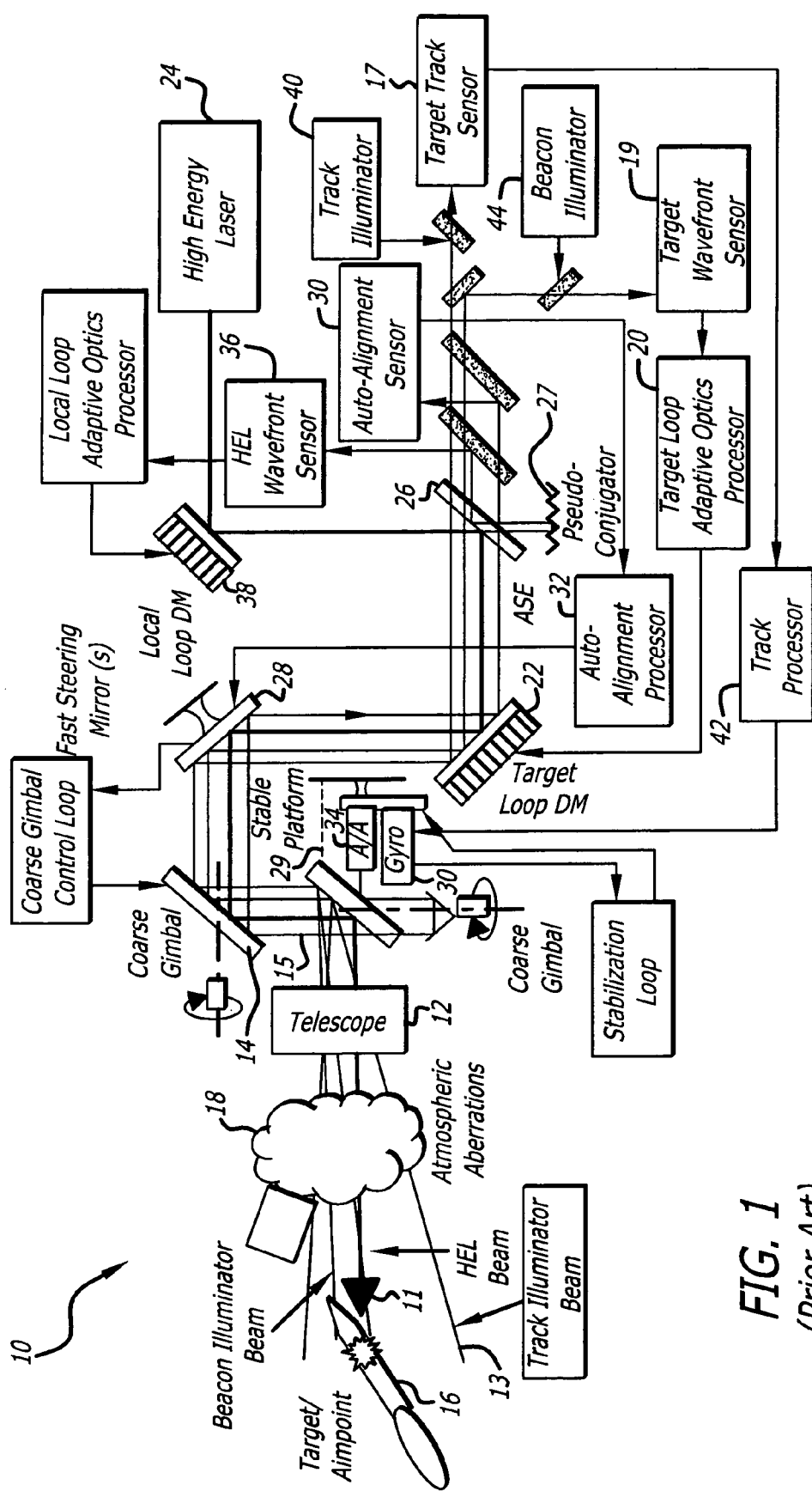
FIG. 1 is a simplified optical schematic of a conventional high-energy laser beam control architecture.

FIG. 1 is a simplified optical schematic of a conventional high-energy laser beam control architecture. In the system 10 of FIG. 1, a HEL beam director, generally consisting of a telescope 12 and a 2-axis coarse gimbal set 14, is commanded to the line-of-sight of a target 16 based on an external cue (acquisition or coarse tracking system not shown).

A track illuminator laser 40 provides extended illumination over the entire target 16 and a target track sensor 17 and track processor 42 center the desired aimpoint within the field of view. A beacon illuminator laser 44 then illuminates the aimpoint on the target with a very narrow beam. A target wavefront sensor 19 measures the wavefront error in the reflected beam from the beacon illuminator 44 and the beam control system 10 uses this information to correct the optical aberrations in the beam path.

The target track sensor 17 acquires and images the target and a track processor 42 begins to close a track servo loop maintaining line-of-sight to the target. Optical aberrations along the line-of-sight caused by atmospheric turbulence 18 along the path to the target 16 and the aero-optic effects due to the boundary layer surrounding the beam director turret (moving platforms only) distort the image of the target, causing relatively poor tracking performance. The target wavefront sensor 19 measures this wavefront (or phase) distortion (error) and a target loop adaptive optics processor 20 closes an adaptive optics servo loop around a target loop deformable mirror (DM) 22 effectively nulling the wavefront (or phasefront) error caused by the atmosphere 18. The target wavefront sensor 19 can employ an active sensor with a beacon illuminator 44 to measure either subaperture tilts (Shack-Hartmann sensor) or optical phase (lateral shearing interferometer or transform wavefront sensor). The target wavefront sensor 19 can also employ imaging sensors at different focal positions to infer phase from the passive target imagery using "multi-conjugate" or "phase diversity" adaptive optics techniques. The adaptive optics (AO) loop corrects the aberrations along the target path allowing the track processor 42 to operate on a corrected target image for best performance. It also corrects the portion of the beam path for a high energy laser 24 from an aperture sharing element (ASE) 26 to the target 16, enabling high instantaneous beam intensity (high Strehl ratio) and low beam wander (low angular jitter) on the target.

One or more fast steering mirrors 28 may be used in conjunction with a stable platform and internal active auto-alignment system to provide another level of isolation. This auto-alignment servo loop provides wide bandwidth correction for base motion disturbances which are coupled into the HEL line-of-sight through gimbal bearing stiction, mass imbalance, thermal/structural compliance in the gimbal trunnions, gimbal bearing runout,.and gimbal-axis non-orthogonality.

FIG. 1 shows such an embodiment, wherein the low-bandwidth target track errors sensed by the target track sensor. 17 are used to nudge gyroscopes 30 on a stable platform 29, causing the reference line of sight defined by the stable platform to point in the desired direction of the target 16. A wide-bandwidth auto-alignment servo loop 30, 32, 34 is then closed around the fast steering mirror(s) 28 causing the HEL line of sight to be aligned with the stable platform reference direction. The fast steering mirror 28 may also be used to off-load high frequency tilt corrections from the DM 22, thereby minimizing the stroke requirement of the DM actuators 23.

A track illuminator laser 40 provides extended illumination over the entire target and the target track sensor 17 and a track processor 42 center the desired aimpoint within the field of view. A beacon illuminator laser 44 then illuminates the aimpoint with a very narrow beam. The target wavefront sensor 19 measures the wavefront error in the reflected beam from the beacon illuminator 44 and uses this information to correct the beam path.

A HEL "local loop" system may also be used, as shown in FIG. 1, to correct for wavefront errors in the raw HEL beam 11 as well as non-common path errors between the low-power target-loop beam path and the HEL beam path. The primary cause of non-common path errors is the aperture-sharing element 26, which is thermally distorted as-it absorbs some of the HEL beam power. A typical local loop samples a portion of the HEL beam 11 at the ASE 26 and uses a retroreflector array pseudo-conjugator 27 to retroreflect portions of the beam (beamlets) back to the ASE 26. These beamlets are reflected off the front surface of the ASE 26 and the wavefront error is sensed by a HEL wavefront sensor 36. These errors are then conjugated and applied to the local loop DM 38, which predistorts the HEL beam, driving the wavefront errors to zero. This method of sensing HEL beam and non-common path errors is imprecise due to limitations in the pseudo-conjugator.

FIG. 1 specifically shows a single auto-alignment beam 15 running between a small auto-alignment laser (A/A) 34 on the stable platform 29 and an auto-alignment sensor 30. High performance HEL systems often employ multiple auto-alignment loops to align multiple sensors to a common reference (not shown).

The theory of operation and description of key components for a conventional HEL beam control system may be found in several published references, including:
1. "Adaptive Optics" by Tyson and Ulrich, published in *The Infrared and Electro-Optical Handbook, Volume* 8, Chapter 2, ERIM, Ann Arbor, Mich., pp. 165–237, 1963 and
2. "Directed Energy Systems" by Golnik, published in *The Infrared and Electro-Optical Handbook, Volume* 8, Chapter 5, ERIM, Ann Arbor, Mich., pp. 403–480, 1963.

This conventional approach suffers from at least three limitations:

First, the adaptive optic system does not perfectly correct for the non-common path errors in the ASE or distortions in the HEL beam path from the HEL device to the ASE due to limitations in the pseudo-conjugator.

Second, the deformable mirror is located in the highest intensity portion of the HEL beam path. This is a problem for traditional DM devices because the mirror face sheet is thin and cannot be easily cooled. It is therefore subject to thermal loading distortions and damage if the reflective coatings are not extremely low absorption. Also, because the face sheet must be surface figured after the actuators are bonded, the coating must be applied at sufficiently low temperature that the actuators do not de-bond in the process, making the manufacturing process difficult and the coatings less resistant to laser damage.

Third, traditional DMs using piezoelectric actuators bonded to large-aperture glass face sheets are limited in stroke and bandwidth by the strength and stiffness of the facesheet and the mechanical nature of the device. The servo bandwidth is further limited by the throughput of the adaptive optics processor 20, which typically employs a parallel matrix multiplication process to calculate the actuator commands required to control the shape (surface figure) of the facesheet. Note that for optimal correction, this shape should be the phase conjugate of the incident wavefront, with no latency. Deformable mirrors based on Micro Electro-Mechanical Systems (MEMS) and non-mechanical spatial light modulators such as liquid crystal optical phased arrays, provide larger stroke and much wider bandwidth performance than mechanical DMs. Both of these approaches are physically small and the existing device technologies cannot yet withstand the high beam intensities necessary to control a weapon-class HEL beam.

Figure 2:
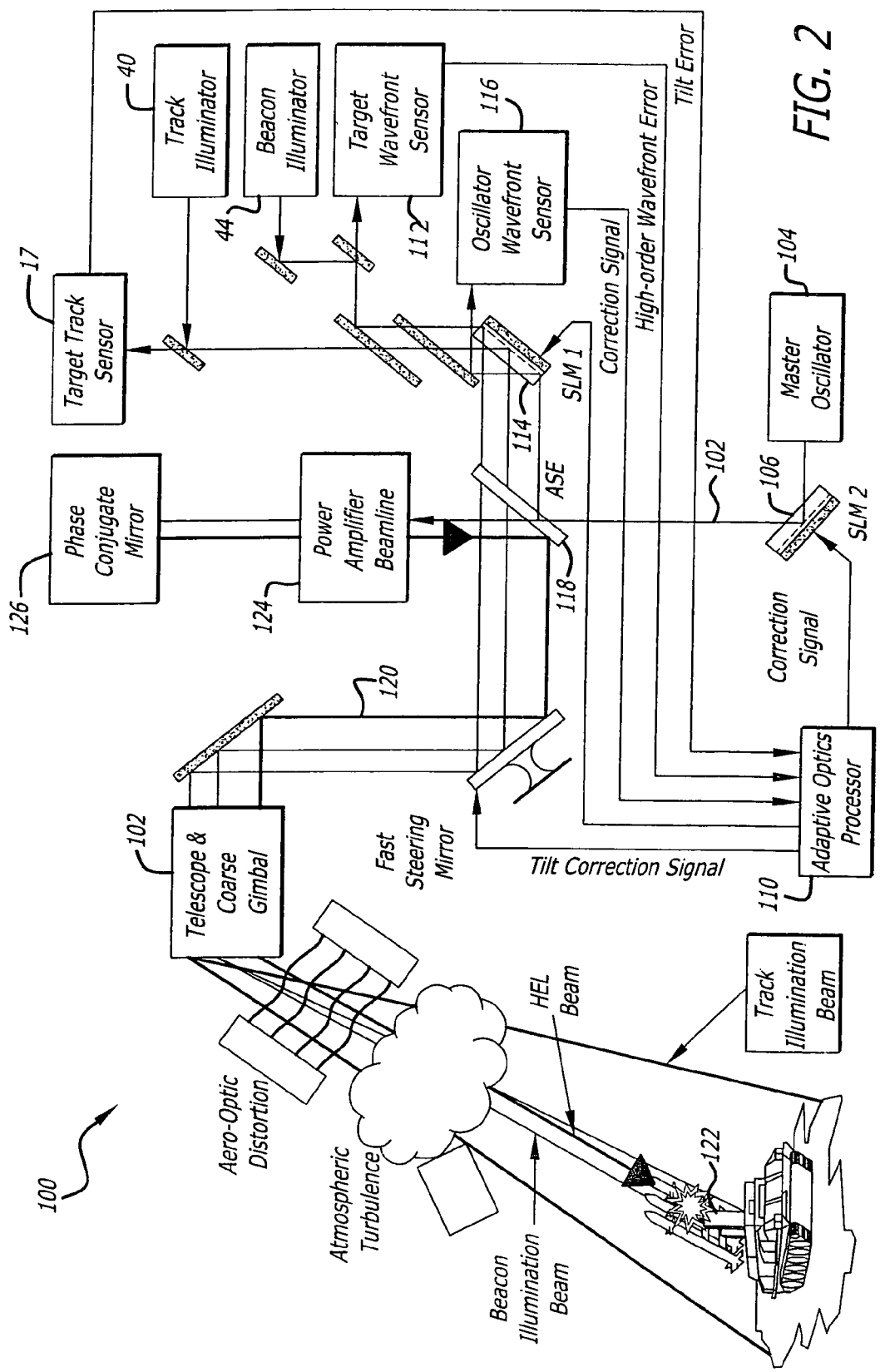
FIG. 2 shows the preferred embodiment of an advanced integrated laser and beam control system that circumvents the aforementioned problems with the conventional approach illustratrd in FIG. 1 in accordance with present teachings.

FIG. 2 shows the preferred embodiment of an advanced integrated laser and beam control system in accordance with present teachings. In this system 100, a beam 102 from a master oscillator 104 is predistorted with an atmospheric correction signal from an adaptive optics processor 110 via a correction or secondary spatial light modulator (SLM 2) 106 which may be implemented with an optical phased array (OPA). The predistorted master oscillator beam 102 is then amplified in a phase conjugate power amplifier beamline 124, which uses nonlinear optical phase conjugation techniques known in the art.

In this embodiment, the ASE and outcoupler functions are combined within a single optical element and the non-common path distortions of the outcoupler/ASE are sensed and corrected using an oscillator wavefront sensor and servo control loop, respectively. The wavefront control elements operate in a low power path, allowing the system to use robust, wide bandwidth, long stroke, high-resolution photonic elements such as MEMS deformable mirrors or liquid crystal spatial light modulators.

This scheme advantageously eliminates the need for high power deformable mirrors. It also provides better target loop adaptive optics correction, because wide bandwidth, high resolution, long stroke photonics-based devices can be used to control the HEL beam. In addition, this scheme replaces imperfect conjugation techniques like the pseudo-conjugator retro-reflective array used in the prior systems with a real phase conjugate mirror, the result of which is a high performance correction of non-common path errors between the HEL and the target loop beam paths, including both reflective and refractive errors in the aperture sharing element.

A target wavefront sensor 112 is operated on-null, ensuring good performance under low signal-to-noise ratio (SNR) conditions, thereby accommodating a wide dynamic range of target reflectivities, target ranges, and atmospheric transmission. The control algorithm for a primary spatial light modulator (SLM 1) 114 is straightforward. It is driven closed loop to flatten the phase fronts at the target wavefront sensor 112. In the best mode, the control algorithm for the secondary SLM (SLM 2) 106 uses a frequency-selective crossover network, whereby the conjugate of the high frequency correction to SLM 1 is summed with the low frequency correction signal from an oscillator wavefront sensor 116. Because the beam from the master oscillator 104 to the oscillator wavefront sensor 116 samples all the non-common path distortions in the proper sense, these errors are fully corrected in the pre-distorted master oscillator beam 102. The conjugated beam from the power amplifier beamline 124, therefore, has the proper phase to correct for distortions along the path to the target exclusively.

Correction for the refractive components of non-common path error in the Outcoupler/ASE 118 is accomplished as follows. The master oscillator beam 102 picks up a vertical refractive phase front distortion in the Outcoupler/ASE 118 as it passes up through the Outcoupler/ASE. It then picks up a horizontal refractive distortion in the Outcoupler/ASE after reflection off the front surface thereof. This horizontal refractive distortion component is the same as that seen by the target signal, which is corrected by SLM 1 through the action of the target loop servo within the adaptive optics processor 110. Therefore the only refractive component of non-common path error present in the master oscillator signal reflecting off SLM 1 is the vertical refractive distortion from the Outcoupler/ASE 118. The adaptive optics processor 110 closes a local servo loop around SLM 2 which, in addition to applying the conjugate of the high frequency common-path correction signal applied to SLM 1 (114), nulls the low frequency wavefront error within this master oscillator signal at the oscillator wavefront sensor 116. In so doing, SLM 2 pre-distorts the master oscillator signal entering the Outcoupler/ASE with the conjugate of the vertical refractive distortion from the Outcoupler/ASE element such that, when it passes through the element toward the power amplifier beamline 124, this component of non-common path distortion is corrected. The amplified HEL beam 120 that reflects off the Outcoupler/ASE 118 and is transmitted to the target 122, therefore, does not contain this vertical refractive distortion component.

Correction for the warped-surface component of non-common path error in the Outcoupler/ASE is accomplished as follows. The master oscillator beam sample picks up the warped-surface phasefront distortion after reflection from the front surface of the Outcoupler/ASE 118. The local servo loop acts to null the wavefront error at the oscillator wavefront sensor 116, causing SLM 2 to pre-distort the master oscillator beam 102 with the conjugate of the warped-surface distortion from the Outcoupler/ASE. This predistorted master oscillator beam 102 is also transmitted to the power amplifier beamline 124 and phase conjugate mirror 126 where it is amplified and conjugated. Two phase conjugation processes have occurred, which produce an amplified HEL beam that contains an un-conjugated component of the warped-surface distortion sensed earlier by the sampled oscillator beam from a back reflection off the front surface of the Outcoupler/ASE. When this component is front-reflected off this front surface, it corrects the warped-surface distortion from the back reflection. The amplified HEL beam that is transmitted to the target, therefore, does not contain this warped-surface component.

The integrated adaptive optics approach shown in FIG. 2 is modified for use in an air-to-ground scenario by the use of two illuminator lasers for active target tracking and target wavefront sensing, respectively. As discussed above in connection with FIG. 1, the track illuminator laser 40 provides extended illumination over the entire target and the target track sensor 17 and track processor. 42 (included as part of adaptive optics processor 110) center the desired aimpoint within the field of view. The beacon illuminator laser 44 then designates the aimpoint with a very narrow beam. The target wavefront sensor 112 measures the wave-front error in the reflected beam from the beacon illuminator 44 and uses this information to correct the beam path.

From a cost and complexity standpoint it is desirable to eliminate one of the illumination lasers and perform both target tracking and wavefront sensing with just one laser.

R. Radick, et al. describe in U.S. Pat. No. 6,563,572 an inventive Shack-Hartmann wavefront sensor that uses correlation tracking within each subaperture to provide useful wavefront information from an extended, low contrast, temporally evolving scene. The teachings of U.S. Pat. No. 6,563,572 are hereby incorporated herein by reference. According to Radick et al., the correlation tracker is an image stabilizing system that compares a real time image with a stored reference image using a fast cross-correlation calculation. This approach replaces the conventional quad-cell tracker portion of the adaptive optics processor with an image correlation tracker capable of tracking simple extended targets such as the sun's disk for high-resolution solar astronomy.

While the correlation Shack-Hartmann wavefront sensor in principal allows both target tracking and wavefront sensing to be performed using a single illumination beam, this approach has several practical limitations. First, the tracking performance is limited by the image quality of the Hartmann sub-apertures, which is poorer than that achievable from a full-aperture imager due to the larger diffraction point-spread function. Second, the resolution of the imaging system within each sub-aperture may be less than that of a dedicated target tracker as it may use only a portion of the focal plane detector array to cover a given sub-aperture. Third, the required illuminator laser power may be very large in order to provide an adequate track signal-to-noise ratio at each pixel within each subaperture array. Finally, the track processor throughput necessary to simultaneously perform the cross-correlation calculations within each subaperture image may be very high. The signal processing required by the correlation Shack-Hartmann wavefront sensor may be problematic for typical air-to-ground HEL targets where the target image is complex, cluttered by the scene, and time varying.

Figure 3:
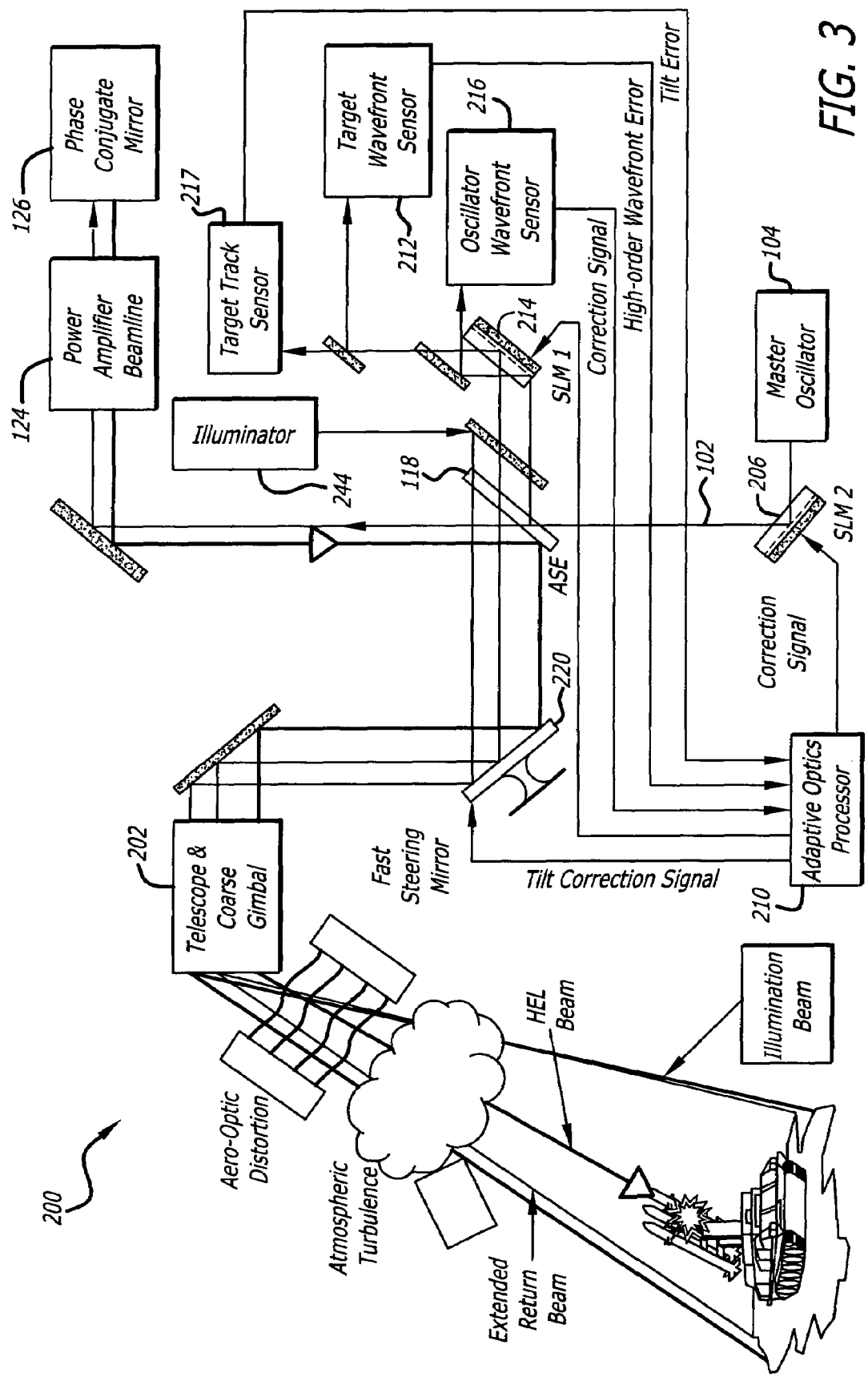
FIG. 3 is a block diagram of a simplified optical schematic of a high-energy laser beam control architecture implemented in accordance with the teachings of the present invention.

The present invention uses a single, wide-angle illumination beam for compensated active imaging, HEL aimpoint selection and maintenance and HEL adaptive optics beam control without the aforementioned limitations of the correlation Shack-Hartman wavefront sensor. A preferred embodiment of the inventive beam control system with extended beacon is shown schematically in FIG. 3 and discussed more fully below. This embodiment of the inventive architecture uses nonlinear optical phase conjugation as part of a solid-state laser beamline to amplify an atmospherically pre-distorted reference beam, thereby eliminating the wavefront control elements from the high power beam path and allowing wide-bandwidth, long-stroke, high Zernike order atmospheric correction using low-power wavefront control elements such as MEMS deformable mirrors (DMs) and/or photonic spatial light modulators (SLMs) which may include liquid crystal optical phased arrays (OPAs). In other embodiments, the inventive architecture may use a more traditional beam control topology with deformable mirror disposed within the high power beam path generally known in the art. The invention uses an adaptive optics processing algorithm, which cleanly separate the tilt (or jitter) component of the sensed wavefront distortion from the higher order aberrations. The algorithm may be based on a traditional modal processing approach wherein a wavefront phase function is described by a Zernike polynomial expansion or other modal decomposition, as described by Tyson and Ulrich on pages 222–223 of "Adaptive Optics" referenced above. Typically the first two orders (first two terms or modes of the polynomial expansion) describe the global wavefront tilt in two orthogonal directions (often referred to in the art as "tip" and "tilt") as measured across the entire aperture (not the subapertures) and it is these terms that are separated from the higher order terms or modes FIG. 3 is a block diagram of a simplified optical schematic of a preferred embodiment of the high-energy laser beam control architecture implemented in accordance with the teachings of the present invention. The system 200 uses a single beacon illuminator laser 244 to illuminate the target over an angle comparable to the isoplanatic angle of the total atmospheric turbulence. The system 200 of FIG. 3 is similar to the system 100 of FIG. 2 with one exception being that the output of a target track sensor 217 is input to an adaptive optics processor 210.

Figure 4:
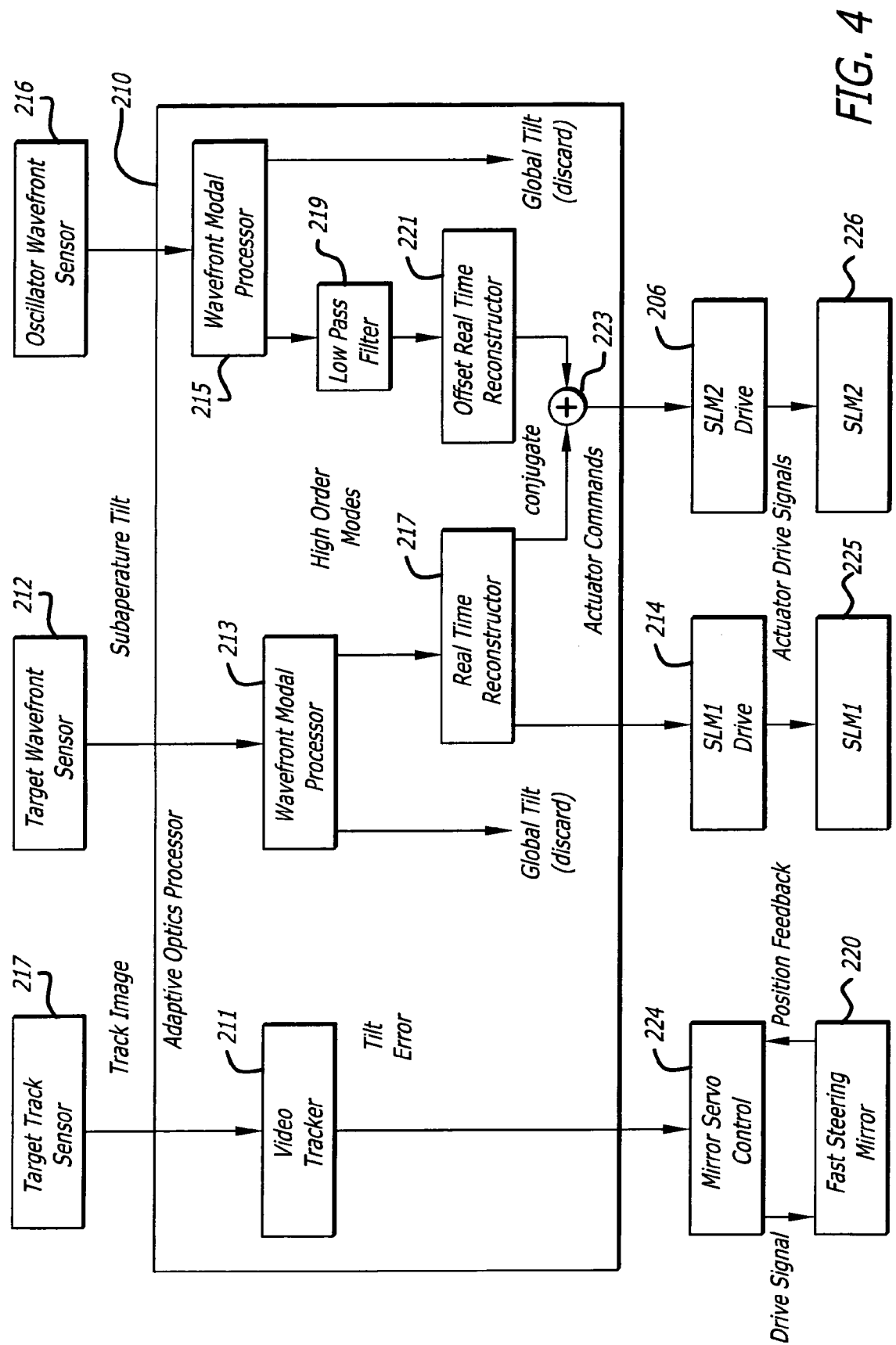
FIG. 4 is a flow diagram illustrative of the operation of the adaptive optics processor of FIG. 3 in accordance with the teachings of the present invention.

FIG. 4 is a flow diagram illustrative of the operation of the adaptive optics processor of FIG. 3 in accordance with the teachings of the present invention. As shown in FIG. 4, in the preferred embodiment, the processor 210 executes a video tracker algorithm 211 implemented in accordance with conventional teachings. In the best mode, the target track sensor 217 is a high frame rate active imaging video camera. Tilt information (due to base motion disturbances in the beam director, atmospheric jitter, and relative target motion) is derived from the apparent motion of the aimpoint within the active image provided by the active target track sensor 217. Tilt information from this sensor 217 is processed by the video tracker 211 using traditional centroid and/or correlation track algorithms to measure the proper aimpoint angular jitter due to (1) relative target movement, (2) atmospheric and aero-optic effects, and (3) base motion disturbances, which are coupled into the line-of-sight. This measurement will be free of artifacts from the beacon motion. The jitter error is then applied by the adaptive optics processor 210 to a mirror servo control circuit 224 which drives a fast steering mirror 220 which in turn corrects jitter in the tracker image and applies a compensating distortion to the line-of-sight of the HEL beam. This minimizes the stroke that the wavefront control elements (SLM 1 and SLM 2) must accommodate.

As illustrated in FIG. 4, the adaptive optics processor 210 further includes a wavefront processor routine 213, which may use "Modal" processing algorithms, or other advanced adaptive optic processing algorithms, to remove the proper tilt error term cleanly from the wavefront sensor data provided by the target and oscillator wavefront sensors 212 and 216 of FIG. 3, respectively, such that the corrected image and HEL beam are corrected for the higher order wavefront errors. In the illustrative embodiment, the wavefront sensor 212 is a traditional quad-cell Shack-Hartmann wavefront sensor. The first-order wavefront tilt modes (one for each transverse axis) are cleanly removed from the wavefront error by the modal algorithm and the higher order correction terms (focus, astigmatism, coma, etc.) are applied to the wavefront control elements, SLM 1 (214) and SLM 2 (206). The tilt term must be removed from this correction signal, because it provides no useful information on the location of the target aimpoint and it carries undesirable artifacts, such as beacon illuminator beam jitter across the target.

"Modal" wavefront control algorithms have been developed and are offered commercially by Adaptive Optics Associates of Boston, MA as part of integrated adaptive optics systems. These "modal" wavefront control algorithms decompose the measured gradient data (i.e., subaperture wavefront tilt) from the Target Wavefront Sensor into a set of orthogonal functions. These functions may be well known polynomials such as the Zernike set, or others more appropriate to a specific system. Once the wavefront is decomposed into the modes of choice, the tilt modes may be cleanly removed from the wavefront data simply by deleting the first two orders (or modes) from the wavefront data set. The higher order modes are then used by the real time reconstructor algorithms to drive the wavefront control elements. The result is well-compensated, high-resolution, full-target imagery and accurate HEL aimpoint maintenance and beam control.

Figure 5:
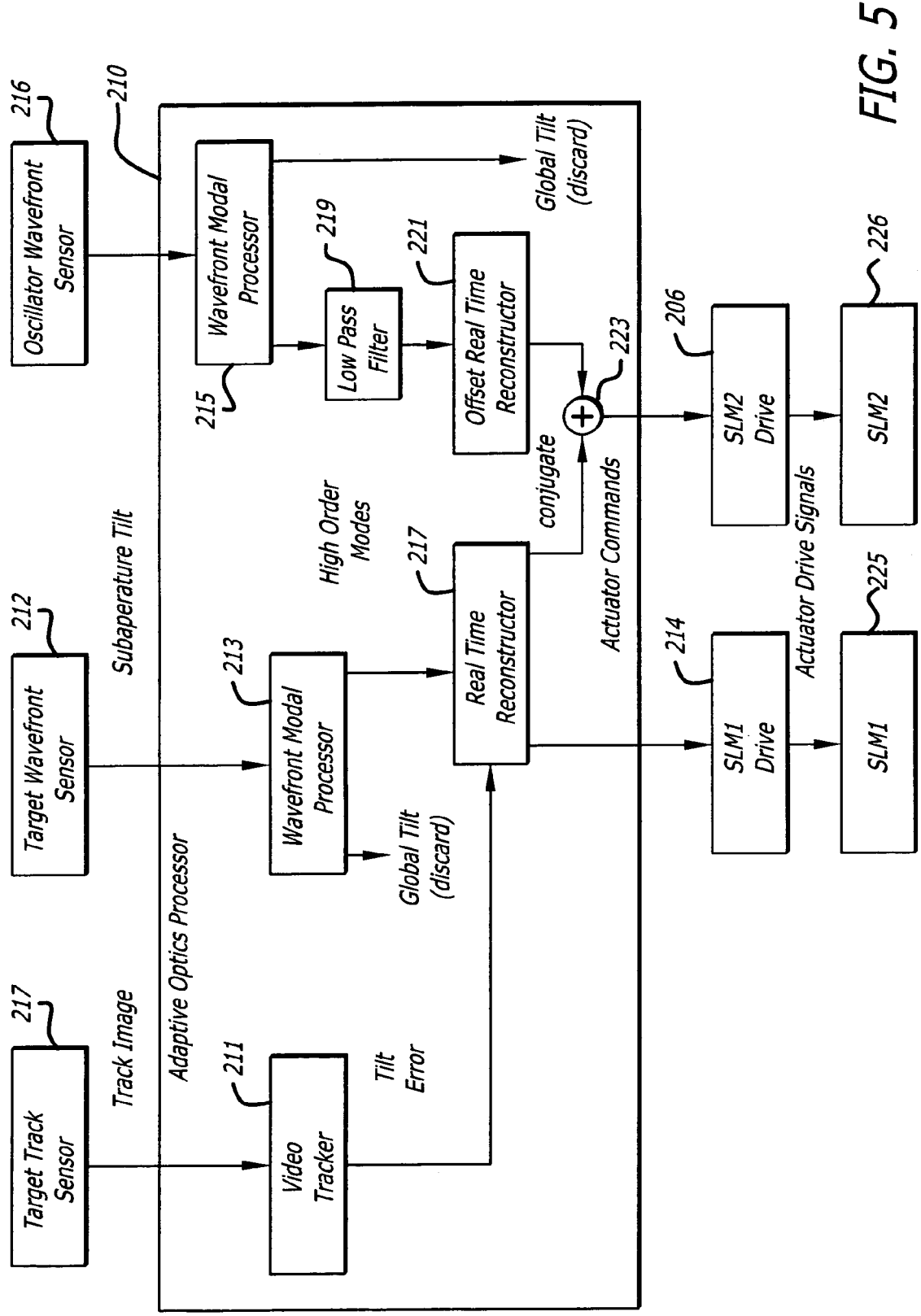
FIG. 5 is a flow diagram illustrative of the operation of an alternative embodiment of the adaptive optics processor of FIG. 3 in accordance with the teachings of the present invention.

FIG. 5 is a flow diagram illustrative of the operation of an alternative embodiment of the adaptive optics processor 210 of FIG. 3 in accordance with the teachings of the present invention. As shown in FIG. 4, the tilt information from the video tracker 211 is input with the high order modes from the wavefront modal processor 213 to the real time reconstructor 217. The high order wavefront modes and the correct global tilt terms processed by the real time reconstructor 217 are used by the SLM drivers 214 and 206 to give actuator drive signals to SLM 1 (225) and SLM 2 (226), respectively. In this embodiment, track errors are not applied directly to the mirror control servo 224 in order to drive FSM 220, therefore, the SLMs must accommodate the full stroke of the total wavefront error including tilt and high order. This is advantageous for applications in which the amplitude of the total wavefront error is within the stroke limits of SLM 1 and SLM 2 and the cost of a wide-bandwidth beam steering mirror 220 and control servo 224 is prohibitive.

The track loop bandwidth should be sufficiently wide to correct for all of the jitter sources within the target line of sight, including relative target-platform motion, atmospheric tilt, and beam jitter induced by base motion disturbances, to obviate the need for a stable platform and independent wide-bandwidth active auto-alignment servo loop. An inertial reference may still be desirable for initial acquisition, coarse tracking, and handover, but the precision and attendant complexity should be very much reduced with the present teachings.

This inventive approach allows the system to use a single extended beacon beam that is much larger than the target aimpoint, but within the isoplanatic angle of the wavefront disturbance, to: (1) measure the higher order wavefront errors using a traditional quad-cell Shack-Hartmann wavefront sensor and (2) track the target aimpoint using a traditional wide-bandwidth imaging active tracker, which may use one of many common centroid or correlation tracking algorithms.

Thus, the present invention has been described herein with reference to a particular embodiment for a particular application. This invention is applicable to a broad range of airborne HEL and long-range imaging missions associated with high-performance tactical aircraft, where the predominant source of wavefront error is aero-optic distortions within the turbulent boundary layer around a large beam director turret. Those having ordinary skill in the art and access to the present teachings will recognize additional modifications, applications and embodiments within the scope thereof.

It is therefore intended by the appended claims to cover any and all such applications, modifications and embodiments within the scope of the present invention.

Accordingly,

What is claimed is:

1. A beam control system comprising:
   first means for receiving a first beam of electromagnetic energy;
   second means for measuring wavefront aberrations in the first beam; and
   third means for removing global tilt from the measured wavefront aberrations to provide higher order aberrations for beam control.

2. The invention of claim 1 wherein second means for measuring wavefront aberrations in the first beam is a Shack-Hartmann wavefront sensor.

3. The invention of claim 1 further including means for correcting a second beam for said higher order aberrations.

4. The invention of claim 3 wherein said second beam is a high energy laser beam.

5. The invention of claim 1 wherein said third means includes a modal adaptive optics processor.

6. The invention of claim 3 further including means for detecting angular jitter of a selected target aimpoint of said second beam communicated via said first beam of electromagnetic energy.

7. The invention of claim 6 wherein said means for detecting angular jitter is a wide bandwidth track sensor.

8. The invention of claim 6 further including means for controlling pointing direction of said second beam in response to said detected angular jitter.

9. The invention of claim 8 wherein said means for controlling said pointing direction includes means for executing a centroid track algorithm.

10. The invention of claim 8 wherein said means for controlling said aimpoint includes means for executing a correlation track algorithm.

11. A beam control system comprising:
first means for receiving a first beam of electromagnetic energy;
second means for measuring wavefront aberrations in the first beam;
third means for removing global tilt from the measured wavefront aberrations to provide higher order aberrations;
fourth means for correcting a second beam for said higher order aberrations;
fifth means for detecting angular jitter of a selected target aimpoint of said second beam communicated via said first beam of electromagnetic energy; and
sixth means for controlling the pointing direction of said second beam in response to said detected angular jitter.

12. The invention of claim 11 wherein said second means includes a Shack-Hartmann wavefront sensor.

13. The invention of claim 11 wherein said second beam is a high energy laser beam.

14. The invention of claim 11 wherein said third means includes a modal processor.

15. The invention of claim 11 wherein said means for detecting angular jitter is a wide bandwidth track sensor.

16. The invention of claim 11 wherein said means for controlling said aimpoint includes means for executing a centroid track algorithm.

17. The invention of claim 11 wherein said means for controlling said aimpoint includes means for executing a correlation track algorithm.

18. A beam control method including the steps of:
receiving a first beam of electromagnetic energy;
measuring wavefront aberrations in the first beam with a Shack-Hartmann wavefront sensor; and
removing global tilt from the measured wavefront aberrations to provide higher order aberrations for beam control.

* * * * *